Patented Aug. 11, 1953

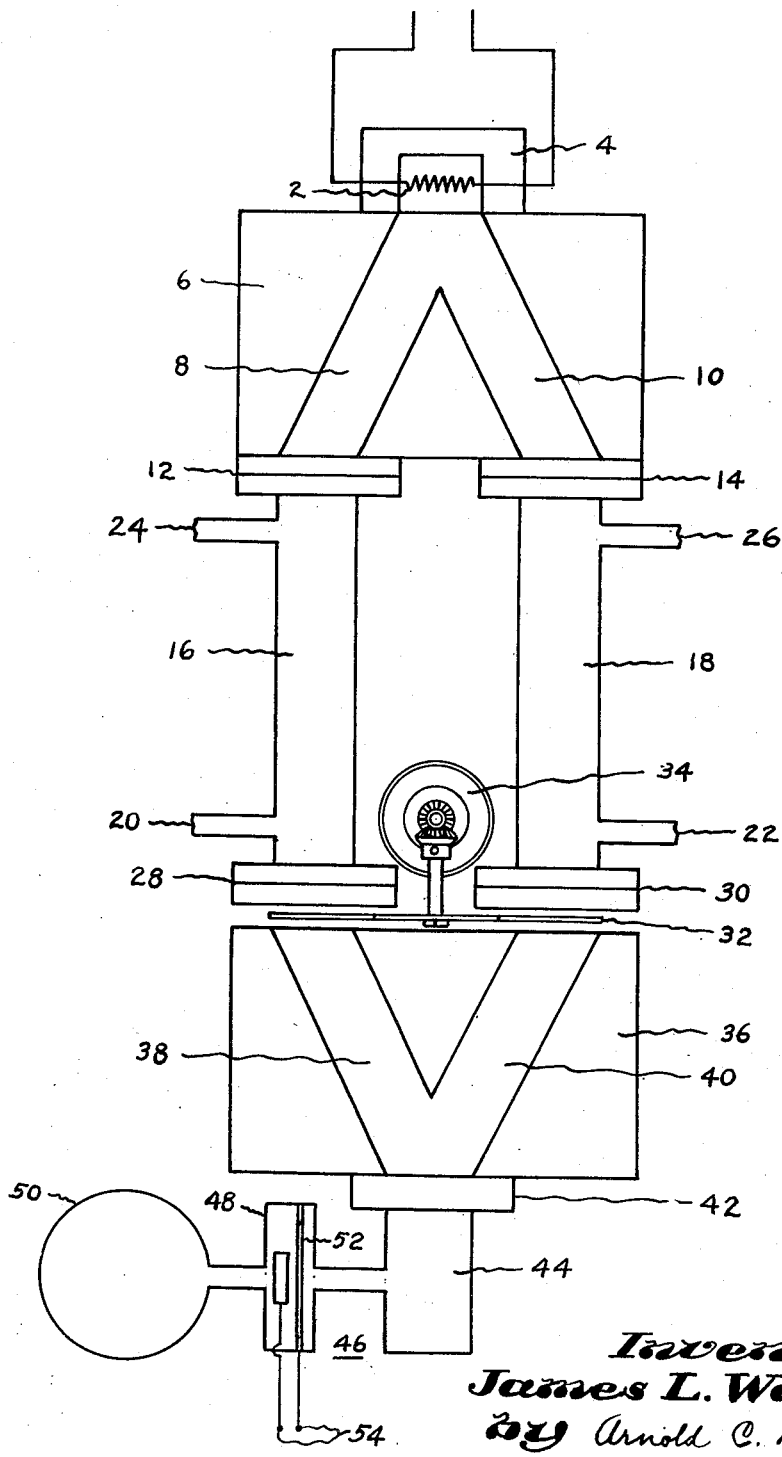

2,648,775

UNITED STATES PATENT OFFICE 2,648,775

METHOD FOR THE ANALYSIS OF MIXTURES

James L. Waters, Framingham, Mass., assignor to James L. Waters, Inc., Framingham, Mass., a corporation of Massachusetts Application April 19, 1949, Serial No. 88,346

5 Claims. (Cl. 250—43.5)

This invention relates to the analysis of mixtures, and more particularly to an improved method for the measurement of the concentration of one component of a mixture by the measurement of the absorption of radiant energy by the mixture.

The present invention is applicable to the analysis of mixtures of solids, as well as to mixtures of fluids, specifically liquids and gases. The radiant energy, moreover, may be in the ultra-violet, in the range of visible light, or in the infra-red. The invention will be specifically illustrated herein, however, with respect to the analysis of mixtures of gases by means of infra-red radiation.

It is known to detect and measure one component of a gaseous mixture by measuring the absorption of infra-red radiation by the mixture in predetermined spectral regions. It is also known that a more accurate measurement can be made if the analysis mixture affects the difference between two beams of infra-red radiation rather than the magnitude of one beam.

A practical instrument must measure only the constituent to be determined and must not be affected by other gases present in the mixture. Various techniques have been employed to selectively measure one gas in a mixture. A radiation source emitting limited infra-red spectral regions has been used. In this case only gases absorbing in these regions are measured. In another method, one beam has been desensitized to limited spectral regions, and the gas sample allowed to affect both beams. Thus, only a gas absorbing in the desensitized spectral regions produces a difference between the two beams. Still another method of obtaining selectivity is to use a filter to alternately pass and interrupt limited spectral regions while all other regions are being passed continually. In this system both the beams have been filtered simultaneously, and passed simultaneously.

A detector possessing selectivity is one known in the art as a pneumatic detector and comprising a confined infra-red-absorbing gas. When radiation enters the confining chamber the gas absorbs limited spectral regions and a thermal change results. Detection is selective because the resulting thermal change is due only to those limited spectral regions absorbed by the confined gas.

An object of this invention is to provide a method for selectively measuring with high accuracy a radiation absorbing constituent of a mixture even when such constituent is present in low concentration. A further object is to provide such a method suitable for commercial application in industrial plants.

The method of the present invention is applicable in the analysis of mixtures wherein radiation is caused to travel along two paths and is caused to traverse, in at least one of said paths, the analysis mixture containing the component to be determined, and wherein the component to be determined affects the relative intensity of the beams.

In accordance with an important feature of the invention, the individual and alternate reception of the two beams is carried on at a sufficiently rapid rate so that ambient temperature changes between successive beam alternations do not change substantially the measured magnitude of the difference between the beams. The thermal variation in the receiving gas occurring at the frequency of alternations and caused by the difference in radiation absorbed by the receiving gas from the two beams is measured, and this measurement is a highly accurate index of the extent to which the component to be determined is present in the analysis mixture.

Where gases are to be analyzed, infra-red radiation is employed and is caused to travel along two paths, and the radiation is caused to traverse the analysis sample containing the gas to be analyzed in at least one of said paths. In such gas analysis, the two beams of infra-red radiation are individually and alternately received in a confined infra-red-absorbing gas having at least one spectral absorption region in common with a spectral absorption region of the constituent to be determined. Continuous measurement is made of the electrical capacity changes produced by thermal variation in the body of confined gas occurring at the frequency of alternation and caused by the difference in radiation absorbed by the body of confined gas from the two beams.

In the analysis of a fluid to determine a constituent thereof, the fluid analysis mixture may be maintained continuously in the paths of two beams of infra-red radiation of substantially equal intensity. One of said beams may be caused to traverse an additional medium, and the other of said beams may be caused to traverse another additional medium. The latter or second additional medium is one whose spectral absorption differs from that of the first additional medium in at least one of the spectral regions absorbed by the constituent to be determined.

The two beams, after passage through the analysis mixture and the additional media, as described in the preceding paragraph, are separately and alternately projected into a body of confined gas having at least one spectral absorption region in common with the constituent to be determined, and this separate and alternate projection is continued at a sufficiently rapid rate so that ambient temperature changes between successive beam alternations do not change substantially the magnitude of the difference between the beams. The concentration of the constituent of the fluid to be determined is ascertained by measuring thermal variation in the body of confined gas occurring at the frequency of alternation and caused by the difference in radiation absorbed by the body of confined gas from the two beams.

Further with respect to the analysis of fluids, the two beams of infra-red radiation may be passed separately and alternately along the two paths, and then projected into the body of confined gas, as distinguished from the separate and alternate projection of continuous beams issuing from said two paths.

Specifically, the invention may be carried out with respect to the analysis of a gaseous mixture to determine a constituent thereof, for example carbon dioxide, by causing a beam of infra-red radiation to traverse the gaseous analysis mixture containing an unknown quantity of carbon dioxide and causing another beam of substantially equal intensity to traverse a standard comparison gas. The two beams are separately alternately projected into a body of confined gas, for example carbon dioxide, which has the same spectral absorption regions as those of the constituent to be determined.

The separate and alternate projection of the beams is continued at a sufficiently rapid rate, for example from about 3 to about 20 cycles per second, so that ambient temperature changes between successive beam alternations do not change substantially the magnitude of the difference between the beams. By suitable means such as a condenser microphone, there may be continuously measured the electrical capacity changes produced by thermal variation in the body of confined carbon dioxide occurring at the frequency of alternation and caused by the difference in radiation absorbed by the confined carbon dioxide from the two beams.

The alternations in electrical capacity picked up by the condenser microphone may be amplified by a suitable electronic amplifier and recorded by a recording device or otherwise suitably indicated.

In the drawing, which illustrates diagrammatically a specific embodiment of the invention, whereby a gaseous mixture may be analyzed to determine a constituent thereof, there is shown a source of infra-red radiation in the form of a wire helix 2 which may be electrically heated and which when so heated will emit infra-red radiation. Housing 4 for helix 2 opens downwardly to permit the infra-red radiation from the helix to be transmitted to the housing 6 and therein be divided into two beams of substantially equal intensity which pass respectively through channels 8 and 10.

The above-mentioned two beams pass from the housing 6 through windows 12 and 14, which may be of infra-red transmitting material such as silver chloride, and into comparison gas chamber 16 and analysis gas chamber 18, respectively. Both chambers 16 and 18 are shown as provided with inlets 20 and 22 respectively, and outlets 24 and 26 respectively. If desired, continuous supplies of comparison gas and analysis gas may be passed through said chambers.

The two beams of infra-red radiation pass through the chambers 16 and 18 respectively, and out through windows 28 and 30 respectively. Windows 28 and 30, like windows 12 and 14, may be of suitable infra-red-transmitting material such as silver chloride. After passing through windows 28 and 30, the two beams pass, when permitted, the interrupter 32.

The interrupter 32 is rotated at predetermined and preferably constant speed by suitable means 34, and is shaped to permit the beams separately and alternately to enter the housing 36.

As each beam is permitted to pass the interrupter 32 it passes through one of the channels 38 and 40 and through the window 42, which is of infra-red-transmitting material such as silver chloride, and into detector chamber 44 of detector 46.

Detector 46 is shown as comprising a condenser microphone 48 which communicates on one side with radiation-receiving chamber 44, and on the other side with expansion chamber 50. Chambers 44 and 50 are separated by membrane 52 which forms one plate of the condenser microphone. The constituent chambers and passageways of detector 46 are filled with a gas having at least one spectral absorption region in common with a spectral absorption region of the component for which analysis is to be made. By means of condenser microphone 48, electrical capacity changes produced by thermal variation in the body of gas confined in detector chamber 44 may be measured. Suitable amplifying and recording apparatus may be connected to leads 54.

In the operation of the embodiment illustrated, for example for the determination of the carbon dioxide ($CO_2$) content of a gas, the gaseous analysis mixture containing the unknown quantity of $CO_2$ may be placed in the analysis gas chamber 18. A comparison gas, for example nitrogen free from $CO_2$ may be placed in comparison chamber 16. Chamber 44 and the remainder of detector 46 may be filled with $CO_2$, which of course has the same spectral absorption as the constituent to be determined.

Infra-red radiation from heated helix 2 is transmitted in beams of substantially equal intensity through channels 8 and 10 respectively, and through the nitrogen in comparison chamber 16, and the analysis mixture containing the unknown quantity of $CO_2$ in analysis chamber 18, respectively.

By rotating the interrupter at 10 cycles per second, the beams passing through the comparison gas, and the analysis gas, respectively, will be separately and alternately projected into the confined $CO_2$ in the detector chamber 44. No radiation will be absorbed by the nitrogen from the beam passing through the comparison chamber 16 in the spectral absorption regions corresponding to $CO_2$, but so far as the beam passing through analysis chamber 18 is concerned, radiation in the $CO_2$ spectral absorption regions will be absorbed in accordance with the concentration of $CO_2$ in the gaseous analysis mixture.

The $CO_2$ in detector chamber 44 will absorb from each beam substantially all the remaining radiation in the spectral absorption regions corresponding to $CO_2$. The heating effect of each separate and alternate beam on the body of confined $CO_2$ in detector chamber 44 will differ however by reason of the above-mentioned absorption in the analysis chamber 18. There will be ten separate measurements of this difference per second, which is sufficiently rapid so that ambient temperature changes do not change substantially the measured difference between each successive pair of beams.

The thermal variations in the $CO_2$ in detector chamber 44 occur at the frequency of alternation, in this instance 10 cycles per second, and are caused by the difference in radiation, in the spectral absorption regions corresponding to $CO_2$, absorbed by the body of confined $CO_2$ in chamber 44 from the two beams. These thermal variations, such as volume and pressure variations, produce electrical capacity changes in the condenser microphone 48, which may be amplified by a suitable electronic amplifier, and recorded or indicated. By suitable calibrations carried out with gaseous analysis mixtures of known $CO_2$ content, the electrical values obtained above may be interpreted directly in terms of the $CO_2$ content of the gaseous analysis mixture.

When the gaseous analysis mixture is passed continuously through the analysis chamber 18, a continuous determination of the $CO_2$ content may be obtained.

For gas analysis, the source of infra-red radiation may be of any suitable type, such as heated metal, or a hot gas. Two sources of infra-red radiation of substantially equal intensity may be used, or one source divided into two substantially equal beams.

The two beams may be channeled, or otherwise directed in the two paths. Where the two beams are channeled, as illustrated, the chambers preferably have reflecting walls. Conveniently this may be accomplished by the use of polished stainless steel, a material which is useful because of its ruggedness, and because it resists the effect of corrosive gases.

The interrupter may be a motor-driven metal sector wheel, arranged to block one beam while passing the other. In other substances, the blocking portion of the interrupter may be a filter, designed to block only certain spectral portions of each beam, rather than the entire beam. Furthermore, the interrupter may be located to interrupt the beams after passage through the analysis chamber, or before.

The preferred frequency of alternation of the beams is from about 3 to about 20 cycles per second. The frequency of alternation may be as low as about 0.2 of a cycle per second, or lower. On the other hand, the frequency of alternation may be as high as about 400 cycles per second, but generally there is no advantage in increasing the frequency of alternation beyond this point.

The thermal variation in the receiving gas may be determined by measurement of temperature, pressure or volume, or any combination thereof. The condenser microphone, which measures essentially volume change is a convenient means to employ for this purpose because of its immediate response, reliability, and ready availability as an article of commerce.

It will be seen that I have provided by this invention a method of analyzing mixtures which is fast, reliable, and sensitive, and which is applicable for industrial purposes for either continuous or discontinuous analysis.

Having described my invention, what I claim as new and desire to secure by Letters Patent of the United States is:

1. In the analysis of mixtures wherein radiation is caused to travel along two paths and is caused to traverse, in at least one of said paths, the analysis mixture containing the component to be determined, and wherein the component to be determined affects the relative intensity of the beams, the method which comprises continuously maintaining said analysis mixture in the path of the traversing radiation, and individually and alternately receiving said beams in a confined absorbing gas having at least one spectral absorption region in common with a spectral absorption region of the component to be determined, continuing said individual and alternate reception at a sufficiently rapid rate so that ambient temperature changes between successive beam alternations do not change substantially the magnitude of the difference between the beams, and measuring thermal variation in the receiving gas occurring at the frequency of alternation and caused by the difference in radiation absorbed by the receiving gas from the two beams.

2. In the analysis of gases wherein infra-red radiation is caused to travel along two paths and is caused to traverse the analysis sample containing the gas to be analyzed in at least one of said paths, and wherein the gas to be analyzed affects the relative intensity of the beams, the method which comprises individually and alternately receiving said beams in a confined infra-red-absorbing gas having at least one spectral absorption region in common with a spectral absorption region of the constituent to be determined, and continuously measuring the electrical capacity changes produced by thermal variation in the body of confined gas occurring at the frequency of alternation and caused by the difference in radiation absorbed by the body of confined gas from the two beams.

3. The method of analyzing a fluid to determine a constituent thereof, which comprises causing a beam of infra-red radiation to traverse the fluid analysis mixture containing the constituent to be determined and to traverse a first additional medium, causing another beam of infra-red radiation of substantially equal intensity to traverse said fluid analysis mixture and to traverse a second additional medium whose spectral absorption differs from that of the first additional medium in at least one of the spectral regions absorbed by the constituent to be determined, continuously maintaining said fluid analysis mixture in the paths of said beams, separately and alternately projecting said beams into a body of confined gas having at least one spectral absorption region in common with the constituent to be determined, continuing said separate and alternate projection at a sufficiently rapid rate so that ambient temperature changes between successive beam alternations do not change substantially the magnitude of the difference between the beams, and measuring thermal variation in the body of confined gas occurring at the frequency of alternation and caused by the difference in radiation absorbed by the body of confined gas from the two beams.

4. The method of analyzing fluids to determine a constituent thereof, which comprises separately and alternately passing two beams of infra-red radiation along two paths at least one of which contains the fluid mixture to be analyzed, continuously maintaining said fluid analysis mixture in the traversing radiation, projecting each beam into a body of confined gas having at least one spectral absorption region in common with a spectral absorption region of the fluid constituent to be determined, continuing said separate and alternate projection at a sufficiently rapid rate so that ambient temperature changes between successive beam alternations do not change substantially the magnitude of the difference between the beams, and measuring thermal variation in the body of confined gas caused by the difference in radiation absorbed by said gas from the two beams.

5. The method of analyzing a gaseous mixture to determine a constituent thereof, which comprises causing a beam of infra-red radiation to traverse the gaseous analysis mixture, causing another beam of infra-red radiation of substantially equal intensity to traverse a standard comparison gas, continuously maintaining said gaseous analysis mixture and standard comparison gas in the paths of said beams, separately and alternately projecting said beams into a body of confined gas having substantially the same spectral absorption regions as those of the constituent to be determined, continuing said separate and alternate projection at a sufficiently rapid rate so that ambient temperature changes between successive beam alternations do not change substantially the magnitude of the difference between the beams, and continuously measuring the electrical capacity changes produced by thermal variation in the body of confined gas occurring at the frequency of alternation and caused by the difference in radiation absorbed by the body of confined gas from the two beams.

JAMES L. WATERS.

References Cited in the file of this patent

UNITED STATES PATENTS

| Number | Name | Date |
|---|---|---|
| 2,212,211 | Pfund | Aug. 20, 1940 |
| 2,431,019 | Barnes | Nov. 18, 1947 |
| 2,435,519 | Tolson | Feb. 3, 1948 |
| 2,443,427 | Kidder et al. | June 15, 1948 |
| 2,469,206 | Rich | May 3, 1949 |

OTHER REFERENCES

Journal of Scientific Instruments, December 1946, pg. 293.